3,450,721
N'-SUBSTITUTED N-ARYLSULFONYL UREA
Henri Dietrich, Arlesheim, Basel-Land, Switzerland, assignor to Geigy Chemical Corporation, Greenburgh, N.Y., a corporation of Delaware
No Drawing. Filed Mar. 22, 1965, Ser. No. 441,927
Int. Cl. C07c *143/80, 143/82;* A61k *27/00*
U.S. Cl. 260—397.7     5 Claims

ABSTRACT OF THE DISCLOSURE

The compounds are of the class of tricyclic benzene sulfonyl ureas, useful as hypoglycaemic agents.

---

The present invention concerns a new N'-substituted N-arylsulfonyl urea which has valuable pharmacological properties, as well as intermediates and processes for the production thereof.

It has been found that N'-tricyclo[4.3.1.1$^{3,8}$] undec-3-yl N-p-aminobenzene-sulfonyl urea of the formula

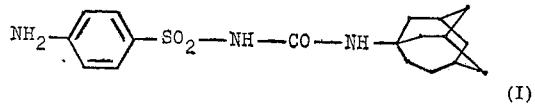

(I)

and its salts as defined hereinafter have a strong hypoglycaemic action when administered orally or parenterally even in very low dosages. The high activity of these compounds is all the more surprising as, with series of known N-arylsulfonyl-N'-alkyl ureas, the strongest action up to the present has been determined in compounds containing an alkyl substituent of 3 to 4 carbon atoms in the phenyl nucleus. In contrast to the dosages necessary for obtaining satisfactory hypoglycaemic action, the toxic dosages of the new compounds defined above are even higher than those of known pharmaceutically accepted oral antidiabetica. Consequently, the therapeutical index of the new compounds of Formula I, according to the invention, when used as oral intidiabetica, is unexpectedly more favorable than that of the known therapeutically accepted antidiabetic agents.

The term "N'-tricyclo[4.3.1.1$^{3,8}$]undec-3-yl-N-p-aminobenzene-sulfonyl-urea" as used in this specification and in the appended claims means the compound of Formula I as well as the alkali metal salts, especially the sodium salt, thereof, pharmaceutically acceptable salts with organic amines especially the lower alkyl ammonium salts, the ethanol ammonium salt, the diethanol ammonium salt, the N,N-diethyl-N-hydroxyethyl-ammonium salt and the morpholinium salt, and also the hydrochloride and the oxalate as acid addition salts thereof, acid addition taking place at the amino group in p-position at the benzene ring.

The compound of Formula I is produced by reacting, optionally in the presence of a condensing agent, tricyclo[4.3.1.1$^{3,8}$]undecane-3-amine with the arylsulfonyl isocyanate corresponding to the formula

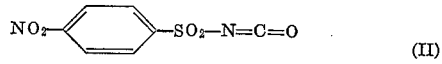

(II)

with a reactive functional derivative of an N-arylsulfonyl carbamic acid corresponding to the formula

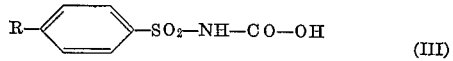

(III)

wherein R represents the nitro group, a lower alkoxycarbonylamino or lower alkanoylamino group, and, optionally, partially hydrolysing the reaction product so obtained containing a lower alkanoylamino or lower alkoxycarbonyl-amino group as R to form the compound of Formula I containing the amino group in lieu of R, or, optionally, reducing a reaction product containing a nitro group as R to form the compound containing the amino group in lieu of R and/or, if necessary, partially hydrolyzing the N-arylsulfonyl-N'-(tricyclo[4.3.1.1$^{3,8}$]undec-3-yl)-guanidine obtained in the first step to form the corresponding urea.

The tricyclo[4.3.1.1$^{3,8}$]undecane-3-amine used according to the invention is a new compound which can be produced as described in Example 1 starting from the known tricyclo[4.3.1.1$^{3,8}$]undecane-3-carboxylic acid by way of its amide and tricyclo[4.3.1.1$^{3,8}$]undec-3-yl isocyanate.

Examples of reactive functional derivatives of carbamic acids of Formula III are their lower alkyl esters, in particular methyl and ethyl esters and also their amides, N - methylamides, N,N - dimethylamides and N-acylamides, i.e. for example, N-arylsulfonyl ureas, N-arylsulfonyl - N' - methyl ureas, N - arylsulfonyl - N',N'-dimethyl ureas, N-arylsulfonyl-N'-alkanoyl ureas, N-arylsulfonyl-N'-benzoyl ureas and N,N'-bis-arylsulfonyl ureas substituted by nitro group or one of the other definitions of R. The reactions are performed, for example, while heating the mixture of reactants in inert organic solvents such as, e.g. diethyl ether, dioxan, benzene, chlorobenzene, toluene, xylene, β-methoxyethanol or butanone. The reactions with isocyanates, carbamic acid esters or ureas, can also be performed in the absence of solvents or diluents. Also, these reactions generally do not require the use of condensing agents; if desired, however, alkali alcoholates, for example, can be used as such agents. Other condensing agents which can be used in reactions with isocyanates are tertiary organic bases; but the isocyanates can also be reacted in the form of adducts with tertiary organic bases.

Tertiary organic bases such as pyridine, triethylamine or tributylamine also serve, for example, as condensing agents in reactions with carbamic acid chlorides. Hydrogen chloride, for example, serves as condensing agent in reactions with carbamic acid nitriles (N-arylsulfonyl cyanamides), or instead of the free tricyclo[4.3.1.1$^{3,8}$]undecane-3-amine, a salt thereof, in particular the hydrochloride is used.

In proceeding via the above-described intermediate compounds which bear the nitro group, this group is reduced for example by catalytic hydrogenation in the presence of Raney nickel or of palladium on charcoal in an organic solvent such as dimethyl formamide, dioxan or ethyl acetate.

In the corresponding starting materials of Formula III and in the intermediate products obtained by the condensation reactions, the substituent R can be the nitro group or it can also be the formamido, acetamido, methoxycarbonylamino or ethoxycarbonylamino group.

The new compound of Formula I according to the invention can be used as oral antidiabetica for the treatment of diabetes mellitus either as such or in the form of its pharmaceutically acceptable salts, e.g. ammmonium or alkali salts or salts with organic bases or in the presence of substances causing salt formation such as e.g. alkali carbonates and bicarbonates. They are administered in the usual dosage forms for this purpose.

The new active substances are preferably administered perorally. The daily dosages vary between 25.0 and 600 mg. for adult patients. Sutable dosage units such as dragées (sugar coated tablets), tablets, preferably contain 50–500 mg. of an active substance according to the invention, actually 20 to 80% of a compound of General Formula I. Such units are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings e.g. to distinguish between various dosages of active substances.

The following instructions further illustrate the production of tablets and dragées:

(a) 1000 g. of N-(p-toluenesulphonyl)-N'-(tricyclo[4.3.1.1$^{3,8}$]undec-3-yl) urea are mixed with 500 g. of lactose and 270 g. of potato starch. The mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of colloidal silicium dioxide are mixed in and the mixture is pressed into 10,000 tablets each weighing 200 mg. and containing 100 mg. of active substance. If desired, the tablets can be grooved for better adaptation of the dosage.

(b) A granulate is produced from 1000 g. of N-(p-chlorophenyl - sulphonyl)-N'-(tricyclo[4.3.1.1$^{3,8}$]undec-3-yl) urea, 345 g. of lactose and the aqueous solution of 6.0 g. of gelatine. After drying, this granulate is mixed with 10 g. of colloidal silicium dioxide, 40 g. of talcum, 40 g. of potato starch and 5 g. of magnesium stearate and the whole is pressed into 10,000 dragée cores. These are then coated with a concentrated syrup consisting of 533 g. of crystallised saccharose, 20 g. of shellack, 75 g. of gum arabic, 250 g. of talcum, 20 g. of colloidal silicium dioxide and 1.5 g. of dyestuff and dried. Each of the dragées obtained weighs 240 mg. and contains 100 mg. of active substance.

The following examples further illustrate the production of the new compounds, but are by no means the only methods of performing the process according to the invention. The temperatures are in degrees centigrade.

Example 1

(a) 58.0 g. (0.3 mol) of tricyclo[4.3.1.1$^{3,8}$]undecane-3-carboxylic acid in 350 ml. of freshly distilled thionyl chloride are refluxed for 45 minutes. 500 ml. of anhydrous benzene are added to the residue obtained by distilling off the excess reactant, the solution is evaporated to dryness and the residue is finally dissolved in 200 ml. of anhydrous tetrahydrofuran. The solution obtained of the crude acid chloride is added dropwise to 500 ml. of an aqueous ammonia solution which has been saturated at 0° whereupon the amide precipitates. After diluting with 1000 ml. of water, the amide is filtered off, the filter residue is washed three times with 200 ml. of cold water each time and taken up in methylene chloride. This solution is dried over magnesium sulphate, evaporated to dryness and the residue is recrystallised from cyclohexane/benzene whereupon pure tricyclo[4.3.1.1$^{3,8}$]undecane-3-carboxylic acid amide is obtained; M.P. 166–168°.

(b) 50.0 g. (0.26 mol) of the amide obtained according to (a) are added at 5° to a mixture of 62 g. of sodium hydroxide, 520 ml. of distilled water and 49.5 g. (0.31 mol) of bromine whereupon the temperature rises to 10°. The yellow, milky emulsion is stirred first for 10 minutes at 5° and then for 1 hour at 80°. After cooling, the reaction mixture is poured into 50 ml. of cold water, the yellow precipitate is filtered off, washed three times with 100 ml. of cold water each time and finally dissolved in 500 ml. of methylene chloride. The solution so obtained is washed with 200 ml. of 2 N hydrochloric acid and with water, dried over magnesium sulphate and evaporated to dryness. After recrystallising the residue from ethanol, pure tricyclo[4.3.1.1$^{3,8}$]undec-3-yl isocyanate is obtained; M.P. 144–146°.

(c) 29.0 g. (0.152 mol) of the isocyanate obtained according to (b) in 400 ml. of 2 N hydrochloric acid and 200 ml. of dioxan are refluxed for 3 hours. The dioxan is then distilled off, the acid aqueous phase which remains is then first washed with ether and then made alkaline, in the presence of 500 ml. of fresh ether, with concentrated sodium hydroxide solution and extracted twice with 500 ml. of ether each time. The ether extracts of the alkaline phase are combined, dried with sodium sulfate and evaporated. The residue is sublimed at 110° under 0.01 mm. Hg and yields pure tricyclo[4.3.1.1$^{3,8}$]undecane-3-amine; M.P. 191–193°, pK in methoxyethanol: 9.55.

(d) 21.5 g. of p-aminophenylsulfonyl urea are dissolved in 400 ml. of dioxan and the solution is added to 16.5 g. of tricyclo[4.3.1.1$^{3,8}$]undecane-3-amine in 400 ml. of dioxan. The salt formed immediately precipitates in crystalline form. The mixture is boiled while stirring vigorously whereupon ammonia is developed and the crystalline precipitate gradually dissolves. On completion of the ammonia development, the solution is concentrated. The residue is dissolved in 100 ml. of cold acetone, a small quantity of undissolved substance is removed by filtration and the filtrate is poured into 200 ml. of 2 N sodium hydroxide solution. After distilling off the acetone, the sodium salt formed is filtered off under suction.

(e) The sodium salt is then dissolved in 200 ml. of 50% alcohol and the solution is poured into 50 ml. of glacial acetic acid while stirring. On filtering off and drying, the N-(p-aminophenyl-sulfonyl)-N'-(tricyclo[4.3.1.1$^{3,8}$]undec-3-yl) urea obtained decomposes at 173°.

Example 2

(a) 22.8 g. of p-nitrophenylsulfonyl isocyanate in 60 ml. of anhydrous toluene are added to 16.5 g. of tricyclo[4.3.1.1$^{3,8}$]undecane-3-amine dissolved in 60 ml. of anhydrous toluene and the whole is refluxed for 2 hours. After concentrating to half the volume and cooling, the N-(p - nitrophenylsulfonyl)-N'-(tricyclo[4.3.1.1$^{3,8}$]undec-3-yl) urea obtained is filtered off (M.P. 156°) and further worked up directly as described in (b) below.

(b) 39.4 g. of the nitro compound obtained above are dissolved in 300 ml. of dimethyl formamide and the solution is hydrogenated in the presence of 20 g. of Raney nickel at normal pressure until no more hydrogen is taken up. The catalyst is then filtered off and the solution is evaporated to dryness. On recrystallizing from methanol, pure N-(p-aminophenylsulfonyl)-N'-tricyclo[4.3.1.1$^{3,8}$]undec-3-yl) urea is obtained.

In order to produce the acid addition salt with hydrochloric acid, the last-mentioned pure free base is dissolved in acetone in the cold, an ether solution of hydrochloric acid is added and the N-(p-aminophenylsulfonyl)-N'-tricyclo[4.3.1.1$^{3,8}$]undec-3-yl) urea hydrochloride which precipitates is separated by suction filtration and dried.

I claim:

1. A compound of the formula

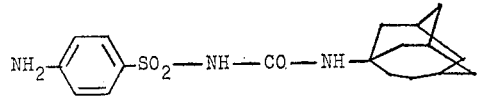

2. A compound of the formula

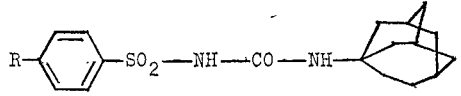

wherein R is a member selected from the group consisting of nitro, lower alkoxycarbonylamino and lower alkanoylamino.

3. N - (p-nitrophenylsulfonyl)-N'-(tricyclo[4.3.1.1$^{3,8}$]undec-3-yl) urea.

4. A pharmaceutically acceptable salt of the compound of claim 1 with a base or an acid compatible with the use of said salt as hypoglycaemic agent.

5. A pharmaceutically acceptable salt of the compound of claim 1 selected from among the alkali metal salts, the lower alkyl ammonium salts, the ethanol ammonium salts, the morpholinium salt and the hydrochloric and oxalic acid salts.

References Cited

Fort et al., Chemical Reviews, vol. 64, No. 3, pp. 291–294 (June 1964).

HENRY R. JILES, *Primary Examiner.*

HARRY I. MOATZ, *Assistant Examiner.*

U.S. Cl. X.R.

260—247.1, 453, 468, 514, 553, 556, 557, 563; 424—228, 321